US012031067B2

(12) United States Patent
Chou et al.

(10) Patent No.: US 12,031,067 B2
(45) Date of Patent: Jul. 9, 2024

(54) METHOD AND APPARATUS FOR ADHESIVE APPLICATION TO BARRIER SHEET

(71) Applicant: SHURTAPE TECHNOLOGIES, LLC, Hickory, NC (US)

(72) Inventors: Kevin Chou, Hickory, NC (US); Patrick Eaton, New Hartford, CT (US); Khaled El-Tahlawy, Hickory, NC (US); Peter Elafros, Hickory, NC (US); William R. Myer, Cherryville, NC (US); George Stamatoukos, Hickory, NC (US); Ed Vargas, Hickory, NC (US)

(73) Assignee: SHURTAPE TECHNOLOGIES, LLC, Hickory, NC (US)

( * ) Notice: Subject to any disclaimer, the term of this patent is extended or adjusted under 35 U.S.C. 154(b) by 776 days.

(21) Appl. No.: 17/051,944

(22) PCT Filed: Apr. 30, 2019

(86) PCT No.: PCT/US2019/029807
§ 371 (c)(1),
(2) Date: Oct. 30, 2020

(87) PCT Pub. No.: WO2019/213022
PCT Pub. Date: Nov. 7, 2019

(65) Prior Publication Data
US 2021/0130652 A1    May 6, 2021

Related U.S. Application Data

(60) Provisional application No. 62/664,622, filed on Apr. 30, 2018.

(51) Int. Cl.
*C09J 7/26* (2018.01)
*G01S 7/481* (2006.01)
(Continued)

(52) U.S. Cl.
CPC .................. *C09J 7/26* (2018.01); *G01S 7/481* (2013.01); *G01S 17/894* (2020.01); *G06T 7/73* (2017.01);
(Continued)

(58) Field of Classification Search
CPC .. C09J 7/26; C09J 2301/204; C09J 2301/302; C09J 2301/408; C09J 2301/416;
(Continued)

(56) References Cited

U.S. PATENT DOCUMENTS 3,532,589 A   10/1970  David
5,317,035 A    5/1994  Jacoby et al.
(Continued)

FOREIGN PATENT DOCUMENTS

EP    1262531 A1   12/2002
JP    02649952 B2    9/1997
KR    101702455 B1   2/2017

OTHER PUBLICATIONS

International Search Report for PCT Application No. PCT/US2019/029807, mailed Aug. 20, 2019, 2 pages.
(Continued)

*Primary Examiner* — Daniel H Lee
(74) *Attorney, Agent, or Firm* — Lippes Mathias LLP (57) ABSTRACT

According to one embodiment, a process for applying an adhesive material onto a barrier sheet substrate is provided. The process includes providing an adhesive material having viscosity of at least about 10,000 centipoise at 250° F. The adhesive material is applied to a multitude of cavities on a surface of a first tool with a coater unit in close proximity to the surface. The adhesive material is transferred from the surface of the first tool to the substrate supported on a surface of a second tool and pressed against the surface of the first tool.

18 Claims, 7 Drawing Sheets

(51) Int. Cl.
  *G01S 17/894* (2020.01)
  *G06T 7/73* (2017.01)
  *H04N 13/254* (2018.01)
  *H04N 13/296* (2018.01)

(52) U.S. Cl.
  CPC ......... *H04N 13/254* (2018.05); *H04N 13/296* (2018.05); *C09J 2301/204* (2020.08); *C09J 2301/302* (2020.08); *C09J 2301/408* (2020.08); *C09J 2301/416* (2020.08); *C09J 2433/00* (2013.01); *G06T 2207/10028* (2013.01); *G06T 2207/30244* (2013.01)

(58) Field of Classification Search
  CPC .... C09J 2433/00; C09J 2203/346; C09J 7/22; G01S 7/481; G01S 17/894; G06T 7/73; G06T 2207/10028; G06T 2207/30244; H04N 13/254; H04N 13/296; B05C 1/0813; B05C 1/0817; B05C 1/083; B05C 1/0808; B29C 63/0017; B29C 63/0078; B29C 63/02
  See application file for complete search history.

(56) References Cited

U.S. PATENT DOCUMENTS

| | | |
|---|---|---|
| 5,374,477 A | 12/1994 | Lawless et al. |
| 5,569,348 A | 10/1996 | Hefele |
| 5,972,147 A | 10/1999 | Janis |
| 2007/0065574 A1* | 3/2007 | Rosati .................. B05C 1/0813 427/256 |
| 2013/0287953 A1 | 10/2013 | McGuire et al. |
| 2015/0037548 A1 | 2/2015 | Jablonka |
| 2016/0333154 A1 | 11/2016 | Kinzelmann |
| 2017/0072430 A1 | 3/2017 | Maier et al. |
| 2019/0153273 A1* | 5/2019 | Araki .................. C09J 153/025 |

OTHER PUBLICATIONS

Supplementary European Search Report for Application No. EP 19796571, Dated Jun. 3, 2022, 6 pages.

* cited by examiner

METHOD AND APPARATUS FOR ADHESIVE APPLICATION TO BARRIER SHEET

This application claims the benefit of U.S. Provisional Application No. 62/664,622 filed Apr. 30, 2018, the disclosure of which is herein incorporated by reference.

BACKGROUND

The present exemplary embodiment relates to a barrier for attachment to an exterior surface of a structure such as a building. It finds particular application in conjunction with a method for manufacturing a flexible barrier that is permeable to vapor but restricts the passage of liquid water and air to the inside of the building, and will be described with particular reference thereto. Such materials are commonly referred to as housewrap, underlayment or roofing underlayment. These materials are typically used in the construction of residential and commercial buildings. However, it is to be appreciated that the present exemplary embodiment is also amenable to other like applications, such as an impermeable barrier.

Housewrap is known for attachment to the outer surfaces of structures (e.g., over the sheathing on a house prior to attachment of its siding) to restrict the passage of liquid water and air (e.g., rain and wind) through the housewrap into the structures, while affording passage of water vapor through the housewrap. Such restriction of liquid water keeps water (e.g., rain) from entering the structures and damaging insulation and structural members, while such restriction of the air prevents air currents from entering the interior of the structures and minimizes air movement within the walls of the structure so that the maximum effective heat retention or "R" values of the walls can be obtained. Passage of water vapor through the housewrap allows water vapor which enters the walls from the interior of the structure to exit so that the water vapor can be restricted from condensing within the walls and potentially damaging the insulation and structural members. House wrap is typically in the form of sheet material attached over the outer surface of the structure.

Exemplary materials of this type include (1) sheet material made of spunbonded high density polyethylene fibers sold under the trade designation "DuPont Tyvek™ Housewrap" by DuPont Company, Wilmington, Del.; (2) sheet material made of spunbonded polypropylene fibers sold under the trade designation "Typar™ Housewrap", Reemeay Inc., Old Hickory, Tenn.; (3) high density, cross laminated microperforated polyethylene sheet material sold under the trade designation "Rufco-wrap" by Raven Industries, Inc, Sioux Falls, S.D., and (4) cross-woven microperforated polyolefin sheet material sold by Fabrene Inc., Mississauga, Ontario, under the trade designation AirGard™.

Attachment can be time consuming and deleterious when staples or other fasteners are used. Accordingly, housewrap and roofing sheet aunderlayment is preferably installed using a pressure sensitive adhesive to avoid penetration of mechanical fasteners. To retain the vapor permeability of the installed sheet material, it may be desirable to use a discontinuous adhesive coating. Moreover, most adhesives act as a water vapor barrier.

Discontinuous coatings are known from US Published Application No. US23017/0072430, herein incorporated by reference, which employs a complicated distribution manifold for adhesive application.

The present disclosure provides an improved method for applying a discontinuous adhesive coating to a barrier substrate.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

According to one embodiment, a process for applying an adhesive material onto a barrier sheet substrate is provided. The process includes providing an adhesive material having a viscosity of at least about 2,500 centipoise, or 4,000 centipoise, or 8,000 centipoise, or 10,000 centipoise or 20,000 centipoise at 250° F. measured by Brookfield Rheometer (RVDVII+) using Spindle #29 at 2 rpm. The adhesive material is applied to a multitude of cavities on a surface of a first tool with a coater unit in close proximity to the surface. The adhesive material is transferred at a thickness of at least about 2 mil from the surface of the first tool to the substrate supported on a surface of a second tool and pressed against the surface of the first tool.

According to a further embodiment, an apparatus for depositing a pressure sensitive adhesive on a barrier sheet substrate is provided. The apparatus includes a coater, a first tool, and a second tool. The first tool comprises a roll including a plurality of cavities. The cavities make up at least about 20% but less than 100% of an area of a barrier sheet substrate contacting surface of the roll and have a depth greater than 3 mils.

According to a further embodiment a barrier article for use in building construction is provided. The barrier includes a flexible substrate which is at least substantially impermeable to water and at least substantially permeable to water vapor. The substrate is at least 60 cm in width, 5 m in length, and 0.001 inches in thickness. The substrate includes a pressure sensitive adhesive deposited on one major surface. The adhesive is in the form of a repeating pattern that covers less than 100% of the major surface. The adhesive has a viscosity of at least 2,000, or 8,000 centipoise at 250° F. and a depth of at least 1 mil.

BRIEF DESCRIPTION OF THE DRAWINGS

The invention consists in the novel parts, construction, arrangements, combinations and improvements, shown and described. The accompanying drawings, which are incorporated in and constitute a part of the specification illustrate one embodiment of the invention and together with the description, serve to explain the principles of the invention.

DETAILED DESCRIPTION

Certain terms are used throughout the description and the claims that, while for the most part are well known, may require some explanation. It should understood that, as used herein:

The terms "(co)polymer" or "(co)polymers" includes homopolymers and copolymers, as well as homopolymers or copolymers that may be formed in a miscible blend, e.g., by coextrusion or by reaction, including, e.g., transesterification. The term "copolymer" includes random, block and star (e.g. dendritic) copolymers.

By using terms of orientation such as "on", "over," "covering", "uppermost", "underlying" and the like for the location of various elements in the disclosed coated articles, we refer to the relative position of an element with respect to a horizontally-disposed, upwardly-facing substrate. However, unless otherwise indicated, it is not intended that the substrate or articles should have any particular orientation in space during or after manufacture.

By using the term "separated by" to describe the position of a layer with respect to other layers, we refer to the layer as being positioned between two other layers but not necessarily contiguous to or adjacent to either layer.

The terms "about" or "approximately" with reference to a numerical value or a shape means+/−five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

As used in this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

In some embodiments, the coated article is a self-adhering barrier membrane. The membrane may be water vapor permeable or water vapor impermeable. The barrier can be formed from any generally flexible sheet, film or laminate, normally supplied in roll form.

The sheet may be microporous, microperforated or some other type of vapor permeable sheet or film. A microporous sheet can be a non-perforated continuous microfibre web with microscopic pores large enough for moisture vapor to pass through, but small enough to resist air and liquid water. Microperforated membranes depend on mechanical pin-perforations and/or film laminations to build in properties.

Suitable microporous sheets can be spun bonded or fibrous bonded polyolefin as described in U.S. Pat. Nos. 3,532,589 and 5,972,147, the disclosures of which are herein incorporated by reference. Exemplary polyolefins are polyethylene and polypropylene. One commercially available microporous sheet is sold under the trade-mark Tyvek. Other suitable microporous sheets include oriented polymeric films as described in U.S. Pat. No. 5,317,035, herein incorporated by reference, which comprise ethylene-propylene block copolymers. One exemplary film is commercially available from RKW Group under the trademark Aptra.

The sheets may be reinforced with various types of scrim materials or may be laminated to other sheets or films, such as non-woven polypropylene or non-woven polyester for the purpose of improving strength and other physical properties. Suitable sheet material could be multi-layer laminates including a microporous or microperforated layer (e.g. polytheylene). An example of such a sheet material is Ultraperm Lite or Ultraperm Max supplied by Industrial Textiles and Plastics, United Kingdom.

Typical vapor permeable air and water barrier membranes will have a width (cross-direction or XD) in the range of about 30 to 250 cm, more typically about 60 to 160 cm; and a length (machine direction or MD) of about 5 to 80 m, more typically about 15 to 40 m. In general, the membrane will typically have a thickness of 0.001 to 0.04 or 0.001 to 0.025 inches.

The membranes are self-adhering, comprising a substrate sheet partially coated on one side with a pressure sensitive adhesive material. A removable release sheet or liner may overlay and contact the adhesive in order to prevent the adhesive from adhering to the back side (i.e., non-adhesive coated) major surface of the substrate in roll form. Suitable release sheets are paper sheet having a silicone release surface coating or treated plastic films. The release liner can be removed prior to applying the membrane to an architectural structure.

Alternatively, the back side major surface of the substrate may include an overlaid or overcoated low surface energy release layer or low adhesion backsize. If the barrier sheet includes a release layer, it may be supplied with a seam tape which includes an adhesive with an affinity for the release layer. For example, if a low surface energy silicone or carbomate including release layer is employed, a seam tape having a suitable pressure sensitive adhesive may be supplied with the barrier substrate. One example may be a polydiorganosiloxane polyurea copolymer with a silicone tackifying resin. As recognized by the skilled artisan the seam tape can be used to seal adjacent edges of barrier sheet substrates as installed on a structure.

Any pressure sensitive adhesive used to adhere membranes to architectural structures (e.g., buildings) may be used. These include both vapor permeable and vapor impermeable pressure sensitive adhesives. Examples of the latter are rubber modified asphalt (bitumen) pressure sensitive adhesive or a synthetic rubber pressure sensitive adhesive.

The pressure sensitive adhesive (PSA) material can be a solventless or hot melt coatable. In some embodiments, solvent based adhesives, water based adhesives, or other types of adhesives, such as, for example, radiation-cured, e.g., ultraviolet (UV) radiation or electron-beam cured (co) polymers resulting from polymerizable monomers or oligomers) may be used. In some embodiments, the adhesive will be at least 99% by weight solids.

Suitable hot melt adhesives may contain ingredients such as (co)polymers such as butyl rubber, styrene-butadiene-styrene (SBS), styrene-isoprene-styrene (SIS), styrene butadiene (SB), styrene-ethylene-butadiene-styrene (SEBS) and ethylenevinylacetate (EVA); resins such as those of the hydrocarbon and rosin types, natural and petroleum waxes, oils, bitumen and others. Suitable (co)polymeric materials include vinyl acetate and (meth)acrylic homopolymers and copolymers such as vinyl acetate acrylic, ethylene vinyl acetate as well as styrene acrylic, vinyl chloride acrylic, vinyl versatate and others.

The adhesive can comprise a non-reactive liquid plasticizer, resin and/or tackifier (e.g. 10-30% by weight) having a first Tg and a UV reactive acrylic polymer (e.g. 90-70% by weight) having a Tg higher than the first Tg. One example of a liquid plasticizer, resin or tackifier is Triacetin, commercially available from Eastman. One example of a UV reactive acrylic polymer is AcResin 250, commercially available from BASF Corporation. The inclusion of a minor amount of a low (i.e., lower than the primary plasticizer) Tg plasticizer, resin or tackifier can advantageously provide desirable adhesive properties in a low temperature environment. The adhesive can have a weight average molecular weight (Mw) of at least 100,000 or at least 198,000 Daltons as measured by Gel Permeation Chromatography (GPC), for example, a Walters Breeze II system with Styralgel, HR1+ E1 column using 30 mg of adhesive dissolved in 10 ml of THF.

The UV curable adhesive can be cured with UV light to obtain a gel fraction (as the insoluble fraction after extraction by ethyl acetate) between 20-50 wt %. The higher the gel fraction, the higher the chemical crosslinking and cohesion strength.

An example of one UV light source includes H and H+ bulbs from Heraeus Noblelight, both of which emit high intensity of UV-C radiation between 250 to 260 nm. The total energy of UV-C radiation is largely responsible for the chemical crosslinking of the acrylics polymers. As an example, it was found that at a total energy (UVC) of 30-60 mJ/cm2, as measured by Power Puck II, led to a gel fraction of 20-50% of the cured adhesive at adhesive thickness of 3 mils (about 75 g/m2 or 2.1 oz/yd2).

To retain a desired level of water vapor permeance in the adhesive coated membrane, the adhesive can be applied to the vapor permeable membrane in a non-continuous manner in order to leave parts or spots or zones of the substrate surface uncoated with adhesive. In general, the adhesive forms adhesive islands on the membrane sea surface.

The adhesive material can be deposited in a repeating pattern such as circles, diamonds, polygons and combinations thereof. Typically, each pattern is at least about 0.5" in width, provided sufficient adhesive is present to satisfy pertinent building code. The patterns can have adhesive free centers. The patterns can intersect in areas. Partial coatings of adhesive may also be applied in a random fashion.

In many instances, the pattern will be applied in a manner that allows the barrier substrate to be affixed to a building such that the major surfaces are oriented vertically, but with the pattern arranged to allow downward water drainage regardless of whether the substrate has its XD or MD dimension aligned with a vertical axis of the building.

In certain embodiments, the barrier sheet substrate may be non-planar. Particularly, the sheet could include draining pockets running one or both of across the MD and/or XD dimension of the sheet with the adhesive material deposited on planar sections interrupting the draining pockets.

The adhesive may be applied so as to cover 5% to 99% of the area of one side of the membrane to obtain a desired balance of adhesion and vapor permeance for the sheet. In some embodiments, the adhesive is applied to cover between 25% and 90% of the area. In certain embodiments, the adhesive is applied to cover between 50% and 80% of the area.

The adhesive may be applied at a thickness of at least 2 mil, or greater than 3 mil, or greater than 5 mil, or greater than 10 mil. The adhesive can have a viscosity of at least 4,000 centipoise, or at least 6,000 centipoise, or at least 10,000 centipoise or at least 12,000 centipoise or at least 20,000 centipoise at 250° F. as measured by Brookfield Rheometer (RVDVII+) using Spindle #29 at 2 rpm.

Figure 1:
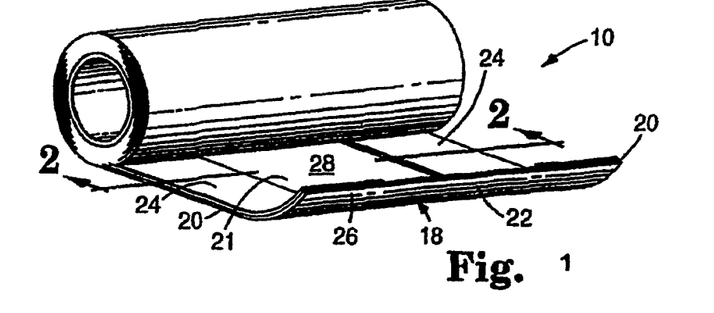
FIG. 1 is a perspective view of a representative barrier laminate.
Figure 2:
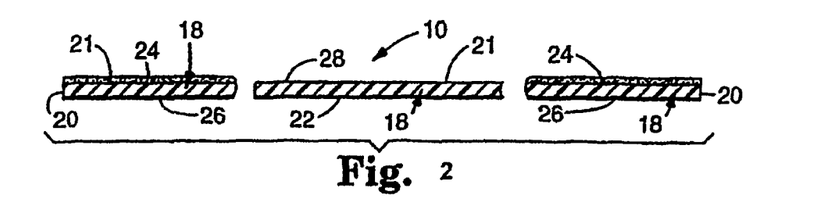
FIG. 2 is an enlarged sectional view taken along lines 2-2 of FIG. 1.
Figure 3:
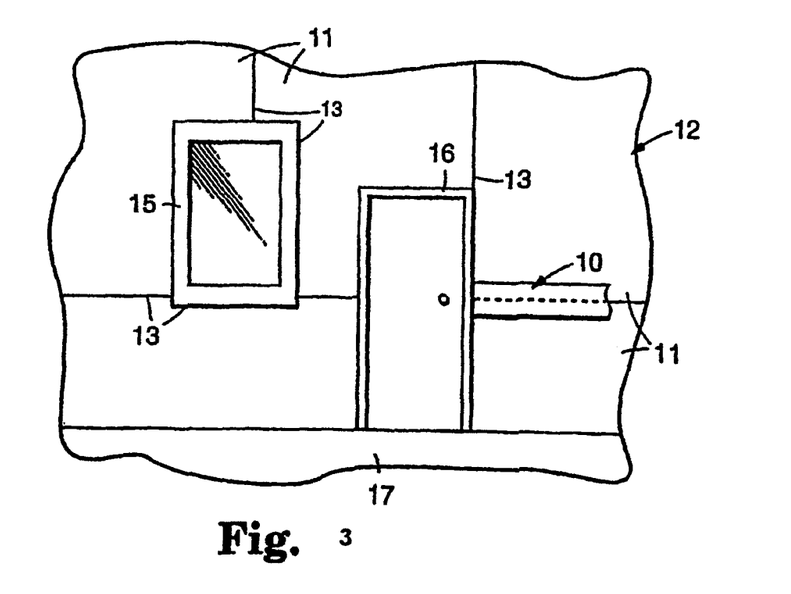
FIG. 3 is a fragmentary view of a building housing the barrier laminate of FIG. 1 applied thereto.

Referring now to FIGS. 1 and 2 a first embodiment of a barrier laminate is designated by the reference numeral 10. The barrier laminate 10 is adapted for attachment to the outer surface of a structure, such as a house 12 illustrated in FIG. 3. The sheathing 11 is attached prior to attachment of siding to cover joints 13 between structural members and between adjacent sheathing members 11, window frame 15, door frame 16, sill 17, corners, cantilevers, raised heel trusses and band joists, etc. assembled to form the structure or house 12. Although a house sidewall is depicted in FIG. 3, the subject flexible barrier underlayment is equally suitable for use with roofs and commercial buildings.

The barrier laminate 10 comprises a flexible elongate barrier layer 18 having opposite edges 20 and opposite first and second major surfaces 21 and 22. The barrier layer 18 can be porous material so that the barrier layer 18 has minute passageways between its major surfaces 21 and 22 affording passage of water vapor between its major surfaces while restricting the passage of liquid water and air between its major surfaces 21 and 22. The barrier laminate 10 also includes a layer 24 of discontinuous pressure sensitive adhesive for adhering the barrier layer 18 to structural members. Particularly, adhesive portions 24 are separated by portion 28 which is free of adhesive to preclude interference of the adhesive with movement of the water vapor through the barrier layer 18.

The adhesive can be deposited onto the substrate carrier sheet by a transfer process, such as through the use of an engraved roll. One suitable example is a gravure roll. One advantage of using a gravure roll is the ability to deposit adhesive onto the substrate carrier sheet at low application rates that can be accurately controlled in terms of thickness and coverage area.

The gravure roll has a circumferential outer surface with an image portion and non-image portion. The image portion is defined by cells that are etched, incised, or indented in a pattern or repeating array below the circumferential surface of the gravure roll. The non-image portion does not contain cells. As the gravure roll rotates against the substrate carrier sheet, the pressure sensitive adhesive material is drawn out of the cells onto the carrier sheet by capillary action and/or surface tension.

Figure 4:
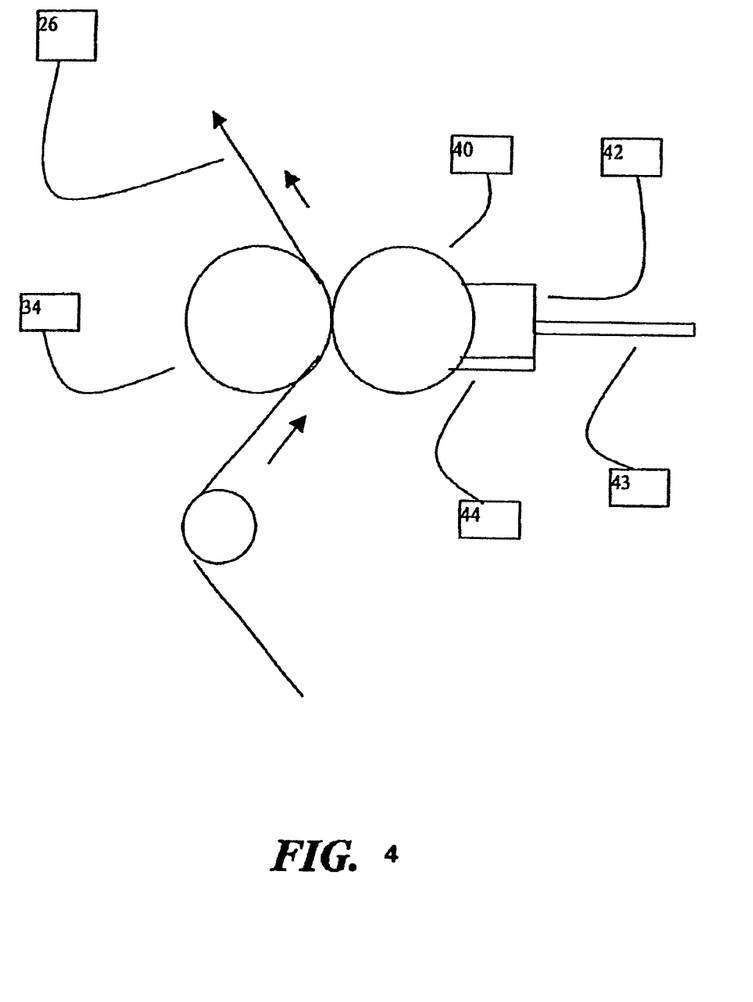
FIG. 4 is a schematic illustration of a representative gravure adhesive application process.

As shown in FIG. 4, the transfer of the adhesive onto a substrate carrier sheet can use a transfer roller such as gravure roll 40. An exemplary gravure roll 40 can be made of metal, such as copper or steel. The roll can be coated with ceramic, chrome, or other plating material. The circumferential outer roll 40 surface has an image portion and non-image portion. The image portion on the surface of the gravure roll is defined by cells (e.g. cavities or indentations) etched or incised in a pattern below the non-image portion of the roll surface. The cells can be clustered or arranged to form a design shape, such as a diamond, square, dot, triangle, line, grid lines, or other shape. Exemplary cells may have a depth of at least 3 mils or at least 4 mils, or at least 6 mils, or at least 12 mils. In many embodiments, the cells have a depth at least 1.5 to 2 times greater than the desired thickness of the adhesive as applied on the substrate.

The gravure roll 40 receives a pressure sensitive adhesive by rotating through a PSA reservoir 42. Reservoir 42 can be replenished via a feed line 43. The circumferential surface can optionally be wiped with a blade 44 to facilitate entry of the PSA into cells. As the gravure roll 40 rotates against the substrate carrier sheet 22, which is continuously advanced through the nip between the gravure roll 40 and opposed counter-rotating cylinder or back up roll 34, the PSA material is drawn out of the gravure roll cells by capillary action and/or surface tension onto the carrier sheet 22. In this manner, adhesive zones are formed in a repeating pattern onto the surface of the substrate carrier sheet 26.

Figure 5:
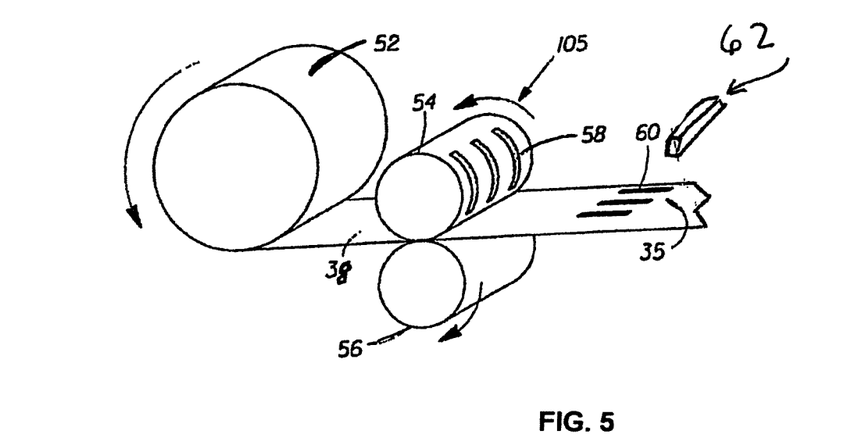
FIG. 5 is a perspective view of an alternative representative adhesive application process.

A similar process is illustrated in FIG. 5. The substrate 38 is provided by a first supply roll 52 and moves through an gravure printing device 105 which comprises a gravure printing roll 54 and a back-up roll 56, that deposits a UV curable PSA composition onto substrate 38. The PSA composition, being in a viscous state, adheres to substrate 34 to provide adhesive zones 60 on substrate 35. A UV generating source 62 is provided to cure the adhesive.

Figure 6:
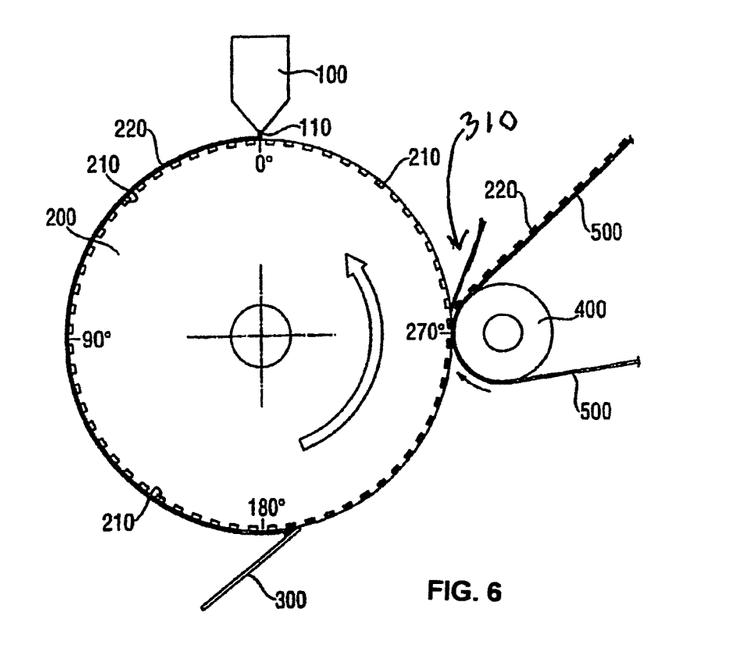
FIG. 6 is a side view of another alternative representative adhesive application process.

FIG. 6 depicts a further alternative gravure roll printing system including a coater 100 having a multitude of applicator units in a row, of which only one is visible. The coater 100 applies adhesive 220 via the applicator units 110 to the gravure cavities 210 on the surface of the first roll 200. A coater blade 300 is used to help direct adhesive into cavities 210.

The direction of rotation of the first roll 200 is indicated and the positions of the coater 100, coater blade 300 and second roll 400 are indicated in degrees of the circle which the cross-section of the first roll 200. A separation blade 310 may be provided to urge the viscous PSA to exit the cavities 210 and attach to barrier substrate 500 as pattern 220.

The coater 100 is positioned at the top of the first roll 200 and thus at 0°. The coater 200 may be positioned at any position provided it is before the position of the second roll 400, in direction of rotation.

The adhesive inclusive barrier substrate may be subjected to additional treatments such as cooling, pressing (e.g., passing between a pair of nip rolls), crosslinking, curing (e.g., via chemical, thermal, radiation methods), and combinations thereof.

At least a plurality of the cavities have a perimeter area of greater than 0.18 square inches and a depth of greater than 3 mils. At least 20% of the barrier substrate contacting surface of the gravure roll may be composed of cavities.

In certain embodiments, it may be desirable for the gravure roll to simultaneously emboss a surface of barrier sheet substrate while depositing the adhesive. For example, the embossing could identify nail zones or imprint other desirable information such as a preferred installation orientation.

The adhesive utilized in association with securing a barrier sheet to a building has a high viscosity and is deposited at greater thickness than adhesive being applied to a label via gravure roll, for example. High viscosity is required so the deposition pattern is maintained until application to the building. As such, the present building wrap barrier materials are a unique substrate for gravure roll adhesive application.

When using a high viscosity adhesive being applied at a significant thickness, capillary action and surface tension may not be sufficient to adequately draw the adhesive from the gravure roll cavities onto the barrier substrate. Accordingly, in certain embodiments, the cavities can include a mechanism to encourage the high viscosity adhesive to exit the cavities. For example, the cavity may be pressurized (continuously or intermittently), may have an angled cell wall, may have a compound angle cell wall, or may have a release coating (such as PTFE). Similarly, it is noted that the present embodiment further contemplates the incorporation of unique handling equipment to effect transfer of the high viscous adhesive from shipping containers (e.g. cans and drums) to the gravure roll. Moreover, it is anticipated that a pressurized feed system may be employed.

In a similar approach, the temperature of the gravure roll may be adjusted so that a heated adhesive material in the gravure roll cells is sufficiently viscous to exit the cells. For example, the gravure roll can include a cavity wall temperature of greater than about 250° F. In this configuration, the adhesive material can exit the applicator at a temperature below 250° F. This design may further include cooling of the barrier substrate (such as a cooled backup roll) to quickly solidify the adhesive upon deposition, such that the desired pattern is retained.

In a further exemplary embodiment, it is contemplated that the cavities of the gravure roll will have a depth of greater than 1.5 times the thickness of the adhesive being applied to the barrier substrate. The cavity depth can be greater than the required adhesive thickness as deposited due to fluid dynamics, with profile of depth vs. deposit being based on cavity configuration, adhesive characteristics, and process parameters. Significant cavity depth can also be used to address the propensity for many building wrap substrates to absorb adhesive.

This methodology recognizes that capillary forces may not be sufficient to remove all (or even substantially all) of the adhesive from each cavity. By providing cavities with an excess depth to desired thickness ratio, removal of only a portion of the adhesive in the cavity (e.g., 33% to 66%) can yield a properly functional self-adhering barrier substrate.

The present disclosure contemplates a barrier substrate being (i) directly coated by the roll and (ii) transfer coated using an intermediate substrate for later transfer to the barrier substrate. The substrate in the transfer coat method can be selected based on stiffness, release level, and other characteristics to facilitate the amount, consistency, and speed of adhesive transfer from the tooling.

The substrate used in the direct coat method can vary based on thickness, stiffness, surface character, and hardness with the process adjustment, backing roll hardness/diameter variation, and control of adhesive viscosity.

In another exemplary embodiment, the gravure roll may have cells of different depths. Accordingly, an exemplary method involves depositing adhesive onto the substrate sheet using a gravure roll having a plurality of cells with at least two different average depths.

EXAMPLES

An exemplary adhesive formulation is as follows:

|  | AcResin 250 (parts by weight) | Triacetin (parts by weight) |
|---|---|---|
| Adhesive | 80 | 20 |

80 parts of AcResin 250 were charged to a planetary mixer preheated to 280° F. 20 parts of Triacetin was added slowly to the mixer and the mixture was agitated for 30 minutes at 280° F. The mixture was then de-gassed and discharged into a 5 gallon pail. The resulting adhesive was homogenous, clear, and free of air bubbles.

The 5 gallon pail containing the adhesive was placed under a 5 gallon Pail Melter, Alta Pail II (Nordson Corporation) for UV-Hot Melt processing. The temperature of the Alta Pail was set at 250° F. to melt & pump the adhesive to an adhesive reservoir where the temperature was maintained at 250° F. The adhesive was then pumped from the adhesive reservoir to a slot die with a shim thickness of 16 mil. 5 mil adhesive was deposited onto a 76 lb polycoated release liner and passed thru a UV light chamber (H+ bulb from Heraeus Corporation). The UVC dose was recorded by an EIT UV Puck II to be 70 mJ/cm2. A Dynamic Mechanical Analyzer (DMA) was used to determine properties of the adhesive as compared to those of the neat Ac250 adhesive. DMA was run at 1 Hz from −75° ° C. to 60° ° C. at ramp rate of 2°/min and strain at 0.05%.

Figure 8:
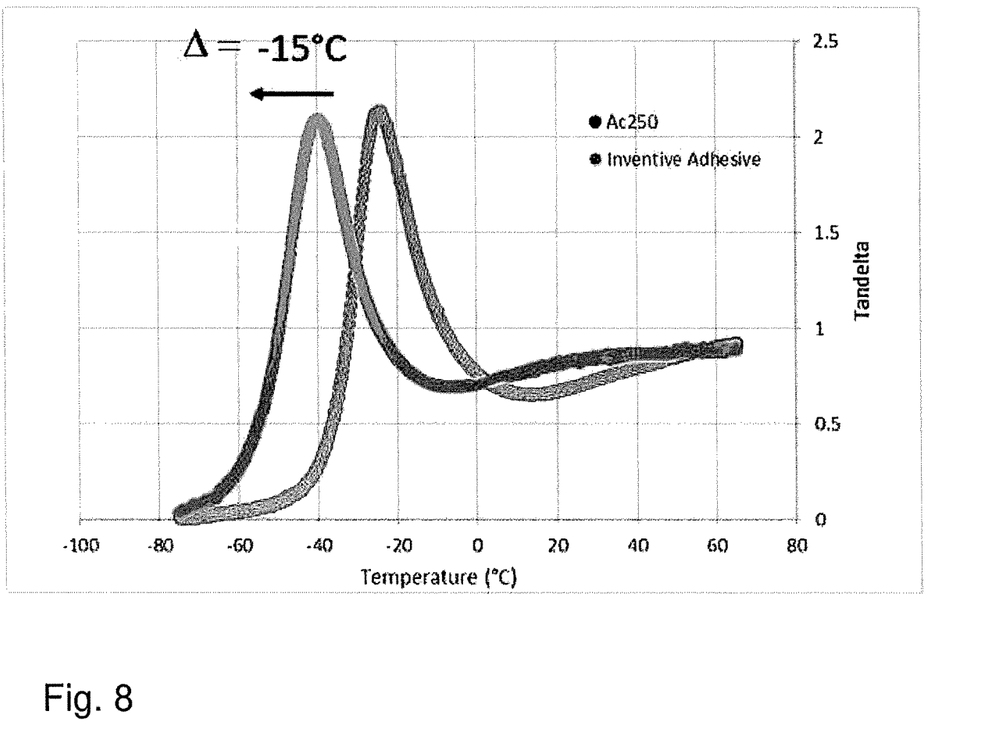
FIG. 8 is a graph of Tan δ vs. temperature for the adhesive compared to AcResin 250.
Figure 9:
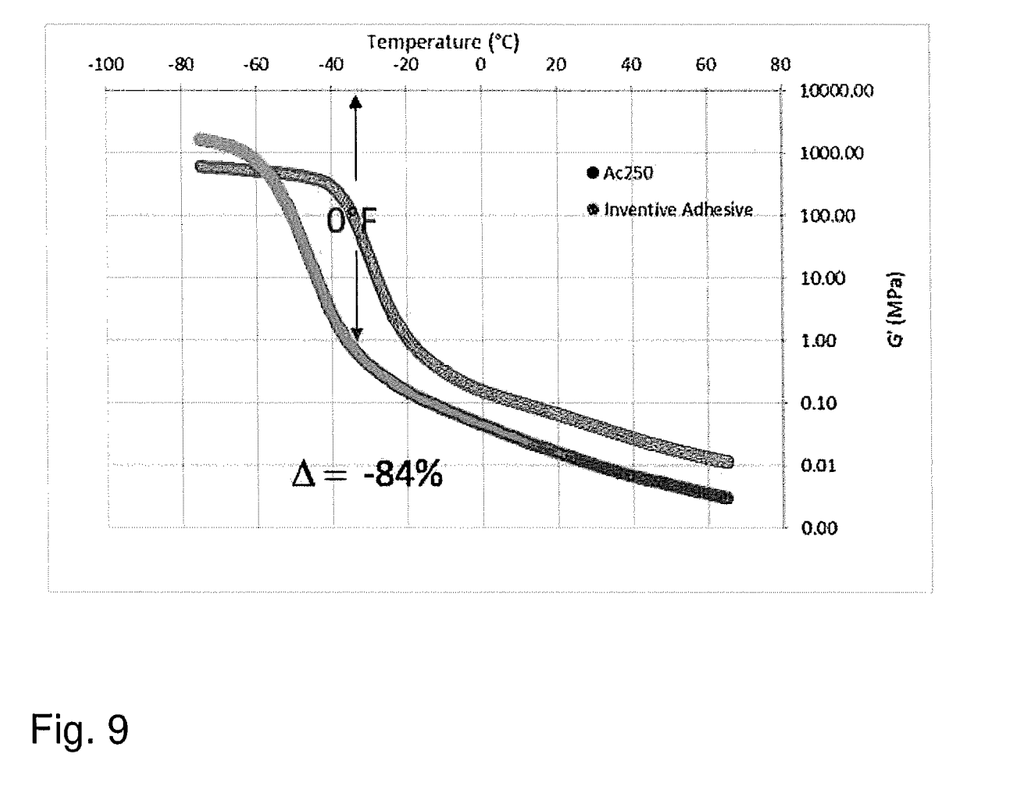
FIG. 9 is a graph of G' (MPa) vs. temperature for the adhesive compared to AcResin 250.

FIG. 8 shows Tan δ vs. temperature for the adhesive compared to AcResin 250. One can see that 20% Triacetin reduced Tg from −23.6 to −38.7° C. FIG. 9 shows G' (MPa) vs. temperature for the adhesive compared to AcResin 250. 20%. Triacetin reduces G' modulus of adhesive from 0.80 to 0.13 MPa at 0° F. (−18° C.).

The DMA properties are shown in the Table below.

|  | Tg by Tan δ peak (° C.) | G' at 23° C. (MPa) | G' at −18° C. (MPa) |
|---|---|---|---|
| Neat AcResin 250 | −23.6 | 0.06 | 0.80 |
| Adhesive | −38.7 | 0.01 | 0.13 |

Peel adhesion of the subject adhesive on Oriented Strand Board (OSB) was measured at 0° F. Both AcResin 250 and the subject adhesive were laminated to a non-permeable TPO based flashing film from CharterNex (8 mil in thickness) to form a flashing tape.

The procedures of peel adhesion on OSB were as follows:
Tapes and panels were conditioned at 0° F. for a minimum of 2 hours. Tapes were applied to panels at 0° F., rolled down on roll down machine, and finger pressure was applied to press tape into the OSB surface. Tapes were allowed to dwell on OSB panels for 16 hours at 0° F. and 90° peel adhesion was measured at 0° F.

The results of 90° peel adhesion on OSB at 0° are shown below. L, C, and R indicate left, center, and right positions across the width of the flashing tape from the UV-Hot Melt Coater.

|  | L (oz) | C (oz) | R (oz) | avg (oz) |
|---|---|---|---|---|
| AcResin 250 | 3.2 | 2.8 | 2.8 | 2.9 |
| Inventive Adhesive | 23.4 | 23.8 | 29.9 | 25.7 |

The subject adhesive outperformed the neat Ac250 by about a factor of 800% at 0° F.

Housewrap Example

AcResin 250 adhesive was deposited in a patterned design onto a breathable housewrap substrate (Utraperm Lite supplied by Industrial Textiles and Plastics, United Kingdom) using a Oil Heater Temp: 330° F., a Drum Unloader Temp: 290° F., a Doctor Blade Temp: 300° F., a Rubber Roll: 39.25", and a Gravure roll with 18 mil deep cell.

Figure 7:
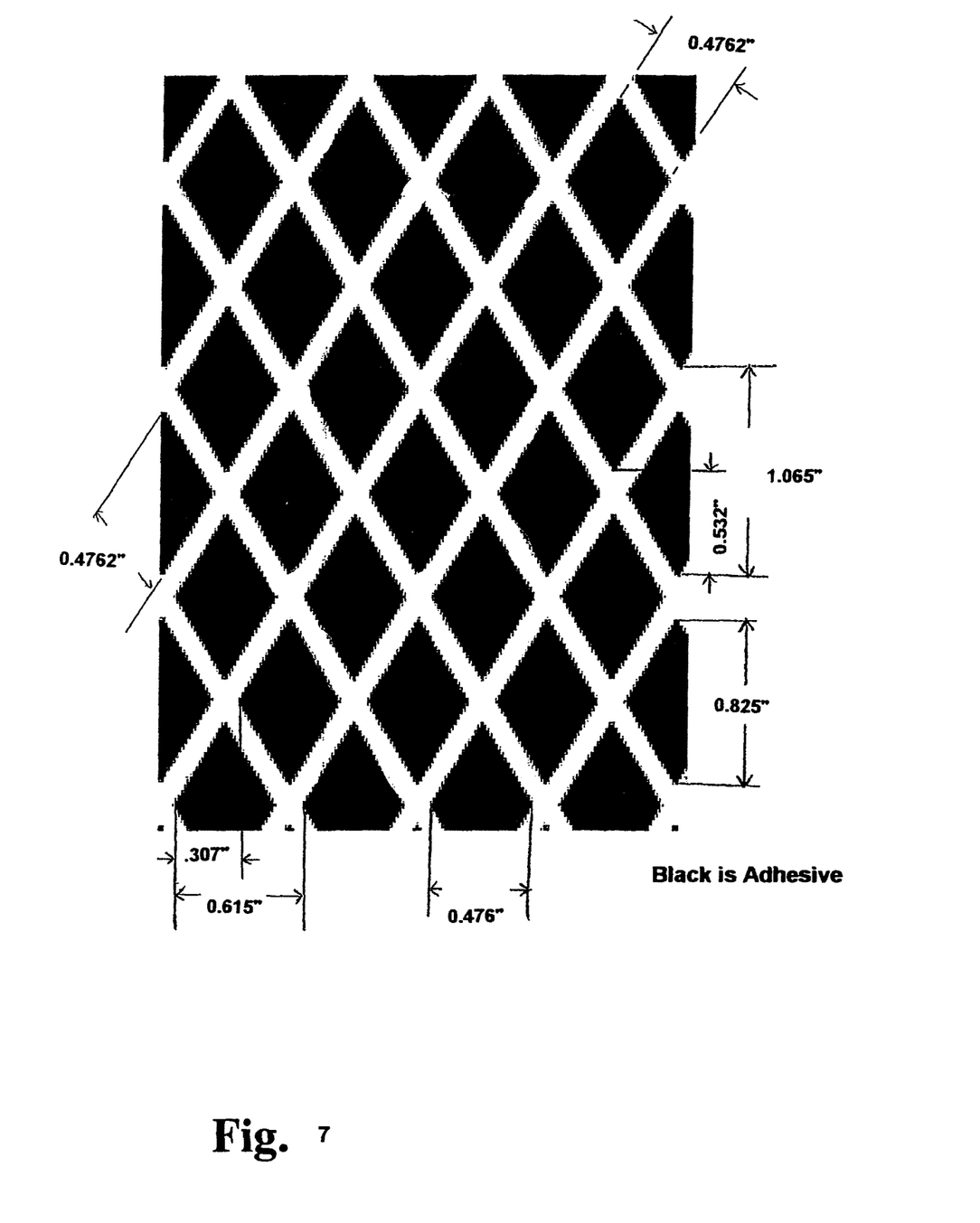
FIG. 7 is a front plan view of an exemplary adhesive application pattern.

The Gravure pattern design is shown in FIG. 7. The diamond shape is the adhesive and the white space between the diamonds is free of adhesive. The adhesive coverage was 60% of the total surface area. The diamond shape (or any other selected shape) may be modified to include a rounded leading edge (i.e., the portion of the pattern that first encounters the separation blade during manufacture). In this context, it may be advantageous to employ shape(s) and their orientation(s) that do not place a longest flat side of the shape parallel to the separation blades longitudinal axis.

The details of process parameters are shown as follows:
Laminator Pressure: 30 psi
Primary Unwind Break: 10
Secondary Unwind Break: 6
Gravure Roll Pressure: 22 psi
Speed: 19 FPM
Primary Unwind—1 mil Liner
Secondary Unwind—Housewrap Fabric
UV power=85% power
UV Dose=187.5 mJ/cm2

The adhesive was pumped from a drum unloader to a semi-enclosed and heated adhesive box, where the gravure roll contacted the adhesive and filled up the gravure cells. The doctor blade wiped off the excessive adhesive, then the adhesive in the gravure cell was transferred onto a 1 mil PET release liner. The adhesive on the release liner entered the UV chamber for curing, followed by laminating the adhesive onto the housewrap substrate, thereby forming a roll of housewrap having a cured pressure sensitive adhesive on one side.

The cured adhesive thickness before entering the laminate station was about 9 mil in thickness. After the cured adhesive was laminated onto the housewrap substrate, a portion of the adhesive penetrated into the porous housewrap fabrics. The table below shows the adhesive thickness of the final housewrap product.

Adhesive Thickness of Final Housewrap Product

|  | Operator Side | Center | Drive Side |
|---|---|---|---|
| Adhesive thickness (mil) | 5.85 | 5.47 | 5.87 |

Adhesive thickness measurements across the web width were taken on Operator, Center, Drive Side of the Coater. From the Table above, one can see that about 37% of adhesive penetrated into the porous housewrap fabrics due to the laminating pressure.

The peel adhesion on OSB from the housewrap product is shown below.

180° Peel Adhesion

|  | Peel (20 min dwell) |
|---|---|
| OSB (oz) | 51.0, 58.0 |

Example 3

The process parameters of Example 2 were repeated except the laminating pressure was increased from 30 to 60 psi. The process conditions were as follows:
Laminator Pressure: 60 psi
Primary Unwind Break: 10
Secondary Unwind Break: 6
Gravure Roll Pressure: 22 psi
Speed: 19 FPM
Primary Unwind—1 mil Liner
Secondary Unwind—Housewrap Fabric
UV power=85%
UV Dose=187.5 mJ/cm2

Adhesive Thickness of Final Housewrap Product

|  | Operator Side | Center | Drive Side |
|---|---|---|---|
| Adhesive thickness (mil) | 2.75 | 5.67 | 3.79 |

180° Peel Adhesion

|  | Peel (20 min dwell) |
|---|---|
| OSB (oz) | 32.1, 30.2 |

The average of adhesive thickness was 4 mil on the final housewrap product. The adhesive was 9 mil in thickness before it entered the laminating station. About 55% of adhesive penetrated into the housewrap fabrics as a result of laminating process.

The peel adhesion on OSB of the housewrap product from the 30 psi Example was higher than that from the Example 60 psi.

Water Vapor Permeability Testing-ASTMD96 Method B

Figure 10:
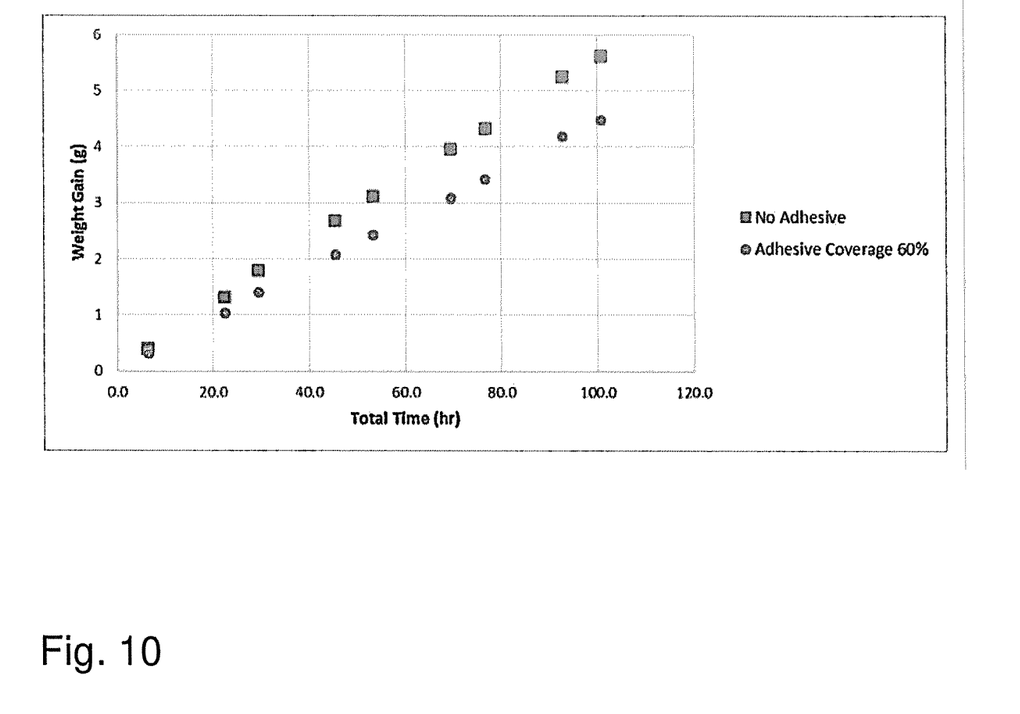
FIG. 10 is a graph of weight gain vs. total time from Example 3.

Water vapor permeability was measured using both housewrap without any adhesive coverage and the housewrap with 60% adhesive coverage (diamond shape) according to ASTMD96 Method B. The weight gain vs. total time plot is shown in FIG. 10.

The housewrap having 60% adhesive coverage shows a reduced weight gain due to a reduction in permeable area. Two permeability measurements for each condition are listed below.

|  | Perm 1 | Perm 2 | Avg Perm |
|---|---|---|---|
| Housewrap Without Adhesive | 116.0 | 117.0 | 116.5 |
| Housewrap with Adhesive at 60% Coverage | 75.0 | 77.0 | 76.0 |

The diamond shaped adhesive at 60% coverage provided sufficient breathability and high peel adhesion on OSB at both 73° F. and 0° F.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A process for applying an adhesive material onto a sheet substrate comprising the steps of: a) providing an adhesive material having viscosity of at least about 10,000 centipoise at 250° F. as measured by Brookfield Rheometer (RVDVII+) using Spindle #29 at 2 rpm; b) applying said adhesive to a multitude of cavities formed on a surface of a first tool with a coater unit having at least one adhesive material applicator in close proximity to the surface; and c) transferring the adhesive material at a thickness of at least 2 mil from the surface of the first tool to said substrate supported on a surface of a second tool and pressed against the surface of the first tool.

2. The process of claim 1 wherein the first tool is a gravure roll.

3. The process of claim 2 wherein at least a plurality of the multitude of cavities have a depth of greater than 3 mils.

4. The process of claim 2 wherein said roll further provides embossing of said sheet substrate.

5. The process of claim 4 wherein said embossing identifies nail or fastener zones.

6. The process of claim 2 wherein at least 20% of a substrate contacting surface of the gravure roll is comprised of cavities.

7. The process of claim 1 wherein said adhesive comprises at least one additive selected from a liquid plasticizer, resin, and/or tackifier having a first Tg and a UV reactive acrylic polymer having a Tg higher than the first Tg.

8. The process of claim 7 wherein said additive comprises 5%-40% by weight of the adhesive.

9. The process of claim 1 wherein said adhesive material is deposited in a repeating pattern that does not cover an entire surface of the substrate.

10. The process of claim 9 further comprising the use of a separation blade, wherein the pattern is comprised of shapes having a longest straight edge that is not parallel to a longitudinal axis of the separation blade.

11. The process of claim 1 wherein said cavities have a depth of greater than at least 1.5 times a thickness of the adhesive as applied on the substrate.

12. The process of claim 1 wherein said cavities include at least one of a mechanism for pressurizing the cavity, an angled cell wall, a compound angle cell wall, a functional coating, or mixtures thereof.

13. The process of claim 1 wherein each of said multitude of cavities is defined by a wall and said wall has a temperature of greater than about 212° F.

14. The process of claim 1 further including, following step c), forming a roll of the substrate.

15. The process of claim 14 further comprising the application of a release coating having low affinity for said adhesive material.

16. The process of claim 14 further comprising the application of a release liner.

17. The process of claim 1 wherein said adhesive is deposited in a thickness of at least 3.0 mils.

18. The process of claim 1 wherein the adhesive material comprises a UV reactive acrylic polymer having a weight average molecular weight (mw) of at least 100,000 Daltons as measured by Gel Permeation Chromatography.

* * * * *